William J. Sweeney
George L. Matheson Inventors
By Edwin M. Thomas Attorney

April 10, 1956  W. J. SWEENEY ET AL  2,741,546
FLOATING CONTROL FOR FLUIDIZED SOLIDS SYSTEM
Filed July 2, 1952  3 Sheets-Sheet 2

William J. Sweeney
George L. Matheson  Inventors
By Edwin M. Thomas  Attorney

April 10, 1956   W. J. SWEENEY ET AL   2,741,546
FLOATING CONTROL FOR FLUIDIZED SOLIDS SYSTEM
Filed July 2, 1952   3 Sheets-Sheet 3

William J. Sweeney   Inventors
George L. Matheson
By Lawrin M. Thomas   Attorney

# United States Patent Office 2,741,546
Patented Apr. 10, 1956

2,741,546

FLOATING CONTROL FOR FLUIDIZED SOLIDS SYSTEM

William J. Sweeney and George L. Matheson, Summit, N. J.; The Summit Trust Company, Summit, N. J., the alternate executor of said George L. Matheson, deceased, assignors to Esso Research and Engineering Company, a corporation of Delaware Application July 2, 1952, Serial No. 296,854

1 Claim. (Cl. 23—288)

The present invention relates to a floating control for fluidized solids systems. More particularly it relates to a means for controlling the handling of finely divided solids in a fluidized state, that is, in a system where finely divided solids are so suspended in dense phase as to behave like a pseudo liquid having hydrostatic and hydrodynamic properties analogous to hydraulic fluids. A specific application relates to a floating apparatus for separating entrained solids from gases in a fluidized solids bed system.

The development of the fluidized solids technique for various chemical and related operations has become of considerable importance in recent years. Perhaps the most important single application relates to the conversion of hydrocarbons by the use of finely divided solid catalysts which are so suspended in a reaction vessel, by means of fluid (gas or vapor) passing upwardly therethrough at a controlled rate, so as to give excellent contact and facilitate cracking, hydroforming, and other hydrocarbon conversion operations.

The fluidized solids system has been applied also to other uses. It may be used for the simple transfer of heat from finely divided solids to gases or vapors, or vice versa. It has application in the reduction of ores as well as in the oxidation of other finely divided solids such as coal. It may be used also in conjunction with a catalyst regenerating system, as in the case of finely divided solid catalysts which are contaminated as by the deposition of carbon thereon. It may be used also in a single vessel system where the finely divided solids are continuously consumed and replenished.

In the operation of fluid solids systems of the character generally described above, a most important operating condition is the maintenance of a dense phase of solids in turbulent suspension. This dense phase is separated by a more or less definite boundary or interface from an upper phase where the solids are relatively much more greatly dispersed. In appearance the dense phase may resemble a boiling liquid, though composed of finely divided solid matter. By contrast the dispersed phase is largely gaseous or vaporous, usually with a minor proportion of entrained solids though in some cases it may be almost or entirely free of solid matter.

In the operation of systems for the catalytic cracking of hydrocarbons, for example, a definite dense phase or fluid bed is maintained which has an interface at a generally predetermined level. This level remains relatively constant under fixed operating conditions but it may be raised or lowered, with a change in the degree of aeration, that is, with the rate and volume of flow of gas or vapor. As the rate of gasiform fluid flowing through the solid material is increased the dense phase becomes less dense. Conversely, when the flow is decreased the dense phase becomes more dense. The interface which separates it from the dispersed phase above is raised or lowered accordingly.

Furthermore, there is always a certain amount of channeling in the dense phase, analogous to the rising of large bubbles through a boiling or other turbulent liquid. At the point where such bubbles break through the surface, there may be considerable turbulence analogous to splashing and wave motion. This turbulence tends to become increasingly violent as the flow of fluid upwardly becomes more channeled or its velocity increases. Channeling is due in part to the nature of the solids, particle size and distribution, coherence between particles, etc.

A particular problem in connection with fluid catalyst conversion of hydrocarbons is encountered in the entrainment of finely divided catalyst in the product which passes from the reaction zone. In general, the average velocity of the gas or vapor which is passing through the turbulent fluid bed is sufficiently low to avoid excessive entrainment of the major proportion of the solid matter. Due, however, to the turbulence, wave motion, bubbling, etc., which has just been described, the relative velocity of the upflowing fluids with respect to the solids may be higher at some points of the interface than at others.

Hence, one object of the present invention is to improve the separation of solids from fluid gases or vapors in a fluidized solids system and to reduce the net overall entrainment of solids.

One means of accomplishing the foregoing is to mount suitable apparatus for separating solids at an appropriate position near the interface, that is, the top boundary of the dense phase in a fluidized solids system. Since this interface varies in height under changing conditions of operation, the separating means, according to the present invention, may be mounted on a buoyant float which is supported by its buoyancy on the dense phase just as a floating vessel is supported upon a liquid. The separating means so supported will rise or fall with changes in general level of the interface.

Although the separation of solids from the upwardly flowing gases or vapors is one important object of this invention, other objects may also be accomplished. Thus, temperature controlling operations or, in general, reaction conditions, rates of flow, introduction of materials involved in the reaction, etc., which have some relation to the level of the interface may be controlled directly or indirectly by a floating element supported on the dense phase or fluid bed.

It is also another object of the present invention to make possible the control of solids separating systems or other mechanisms responsive to the position of a float carried by the dense phase without requiring a mechanical connection between the float and the mechanism being controlled.

The above and other objects will become more fully apparent by reference to a detailed description of specific embodiments of the invention. For this purpose reference is made to the drawings wherein.

Figure 1:
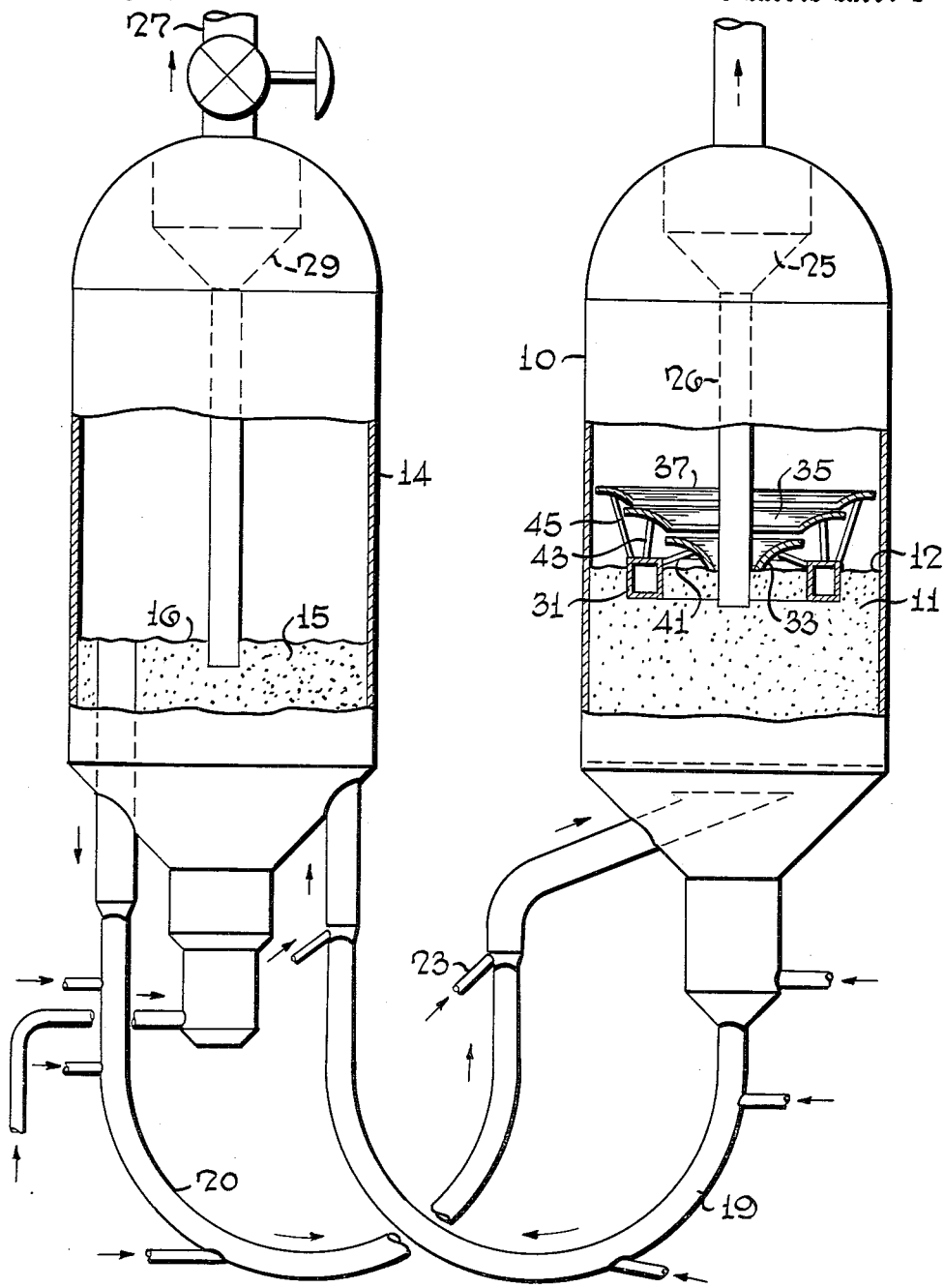
Figure 1 shows diagrammatically in elevation and partially in section a fluidized solids system as used in the catalytic cracking of petroleum hydrocarbons to which one embodiment of the present invention is applied.

Referring first to Figure 1, there is shown a catalytic cracking unit of more or less conventional design. This unit comprises a generally cylindrical reaction vessel or reactor 10 containing a fluidized bed 11 of catalyst having a more or less definite upper level or interface 12. A gasiform fluid, e. g., hydrocarbon gas or vapor is passed upward through the bed 11 to maintain it in the form of a dense, turbulent fluidized mass of solids having the general appearance and the hydrostatic and hydrodynamic properties of a boiling liquid. A separate regeneration vessel 14 contains a similarly fluidized bed 15 of solids having an upper level or interface 16 which distinctly separates the dense phase from a dispersed phase above. In regenerator 14 the upflowing fluid is commonly an oxidizing gas, usually air.

The two vessels are connected by tubes 19 and 20 for circulation of the solids and other materials between the vessels. In one specific apparatus of this type hydrocarbons to be converted, for example, by cracking, are introduced through a tube 23 where they intermix with catalyst from line 20. The hydrocarbons in vapor or gaseous form pass upwardly through bed 11 where they undergo the desired cracking. The cracked vapors are withdrawn from the reactor through outlet 24 after passing through a solids separating mechanism such as a cyclone separator, is indicated at 25. The solids separated from the product vapors are returned to the fluid bed 11 in a conventional manner through a dip leg 26 of the cyclone 25. Similarly, in regenerator 14 an outlet 27 is provided at the top and a conventional solids separator, such as cyclone 29, is provided.

As indicated above, the separation of solids or gases is not always successful even with efficient cyclones. Furthermore, it has been found, as a result of experimental work, that the distance from the interface 16 to the outlet of the vessel as at 27 has an important bearing on the entrainment of solids in the gas or other fluid stream. In general, the greater this distance or "outage," as it is called, the less will be the total entrainment. To the extent, however, that entrainment can be prevented or entrained solids can be removed from the gasiform fluid near the interface, the problem of entrainment may be reduced.

A large part of the entrainment of solids in gasiform fluids passing therethrough is due to the turbulent condition of the interface 12 mentioned above. When waves and other fluctuations of high amplitude are permitted, it appears that there may be considerable breaking up of the dense phase and separation of the finest portions of the solids to be entrained in the gases or vapors. The suppression of these fluctuations so as to reduce their amplitude to a minimum is desirable, as are any conditions which create a more orderly and uniform rate of flow of the gas through the solids bed or dense phase.

Figure 2:
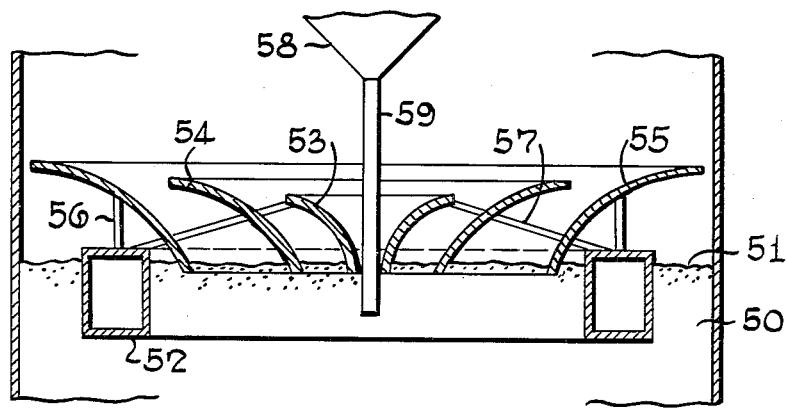
Figure 2 shows in vertical section on enlarged scale, another modification of float supported baffle means.

In order to float such apparatus on a fluidized solids bed, it is necessary that the structure as a whole be highly buoyant. The apparent density of fluidized solids bed in catalytic cracking operations commonly is of the order of only 20 to 40 pounds per cubic foot. In some operations it may be much lighter. According to the present invention, a hollow annular structure preferably of light metal, such as aluminum or thin steel, is provided as the support. Other metals or alloys may be substituted. Such a float is indicated in the reactor 10 at 31. Secured above this annular float member is an appropriate superstructure, which in the present case, consists of a central conical member 33. Member 33 has a central opening to receive the dip leg 26 of the cyclone 25. In general its conical surfaces are directed downwardly and it is surrounded by annularly spaced deflectors 35 and 37. These deflectors are supported upon the annular float 31 by means of appropriate struts 41, 43 and 45. With this device, the uprising gases or vapors with entrained solids are deflected and the solids are largely thrown out and separated, to fall back into the bed 11. In Fig. 2 a modification is shown wherein a similar annular float 52 is supported on a fluidized solids bed or dense phase 50 having an interface 51. This annular float 52 supports a plurality of concentric annular baffle members 53, 54 and 55 by means of strut members 56 and 57. The cross-sectional shape of these baffle members is such that particles or masses of solids erupting from the surface or interface 16 are deflected back toward the body of the dense phase. Most of them will slide down the upper surfaces of the deflectors where they are relatively undisturbed by the gasiform fluids. The latter may pass freely between the baffle or deflector elements. It is desirable to have the lower edges of each of the baffle members 53, 54 and 55 submerged slightly into the dense solids phase to prevent re-entrainment which might occur if the returning solids had to fall through part of the disperse phase.

It will be understood, of course, that such a deflector or separator does not entirely prevent entrainment of very fine particles. It does operate, however, to return some of the solids to the bed and reduce overall entrainment. The cyclone separator 58 separates the remainder through dip leg 59. The early return of entrained particles or the prevention of entrainment not only reduces the load on the cyclone but it also helps maintain proper temperature relationships which are largely controlled throughout the reactor by solids-hydrocarbon ratios.

Figure 3:
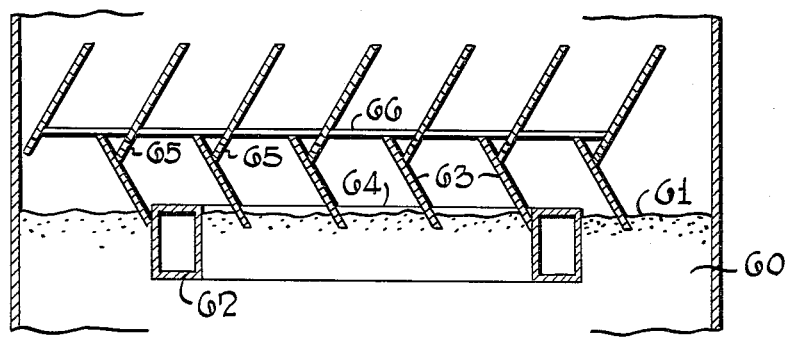
Figure 3 is another vertical sectional view of still another modification.

In Fig. 3 another modification is shown wherein another type of baffle structure is supported on a float 62, supported on a dense phase or bed 60 having an upper level or interface 61.

The baffle structure of Fig. 3 comprises a set of sloping plates 63 arranged generally parallel to each other and spaced to divide a horizontal section of the reactor into strips or zones through which the uprising gasiform fluids must pass. These plates make a steep angle with the horizontal plane, over 45° and preferably 50° to 60° or more. The entrained solids are largely separated by the deflection caused by the baffle plates. They slide down the plates and into the dense phase, the lower edges of all the plates preferably being submerged into the dense phase.

With this structure excessive ebullition or turbulence at the interface is suppressed somewhat without substantially impeding the upward flow of gas or vapor. As in Fig. 2 the separator or deflector structure may be mounted on the float as through supports 64. Its elevation is, of course, controlled directly by the float 62.

Another set or series of baffle plates 67 may be superimposed on the set 63 to increase the deflection and solids separation. These may be supported on the set 63 by means of a suitable structural member or members 68 as will be obvious. The upper set can be omitted for many purposes. For other purposes additional sets can be added when desired, where the float has sufficient buoyancy to support them. Openings 65 in plates 67 allows solids to slide directly down plates 63.

Figures 4, 5:
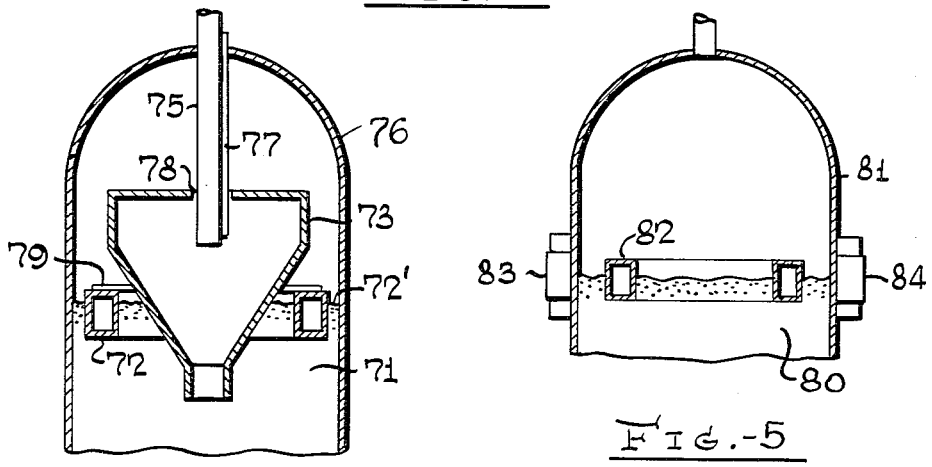
Figure 4 is an elevational view, partly in section on a smaller scale, of another solids separating apparatus which is supported and controlled in elevation by a float on the dense phase.
Figure 5 shows in elevation and partly in section, another embodiment of the invention where the float is used to control external apparatus by which, in turn, other operating devices may be automatically controlled.

In Fig. 4 still another arrangement is shown wherein a float 72 supports a cyclone 73 on a fluid bed 71 having an interface 72'. The cyclone is more or less conventional in type except that it is mounted so it can rise or fall with the float 72 which supports it. For this purpose the outlet tube 75 from reactor 76 extends down inside the reactor and is provided with a spline 77 or fin member. The upper surface of the cyclone has a keyed opening 78 which surrounds the outlet pipe 75 and the spline 77. The parts are designed for free sliding movement but relative rotation is prevented. Hence, the cyclone is held against rotation due to reaction to the tangentially flowing vapors, which would otherwise occur and prevent efficient operation. The cyclone is secured to float 72 by a suitable structural support 79.

Referring now to Fig. 5, there is shown a system which is applicable to fluid bed systems where support of an operating element directly on the float is not feasible. In this modification, a float 82 of light construction is supported by buoyancy on a fluid bed 80 in an appropriate vessel 81. Suitable electronic, electrostatic or magnetic detecting devices are mounted on the reactor vessel 81 as at 83, 84, to detect the level of the float as the height of bed 80 varies. Thus, if float 82 is made of steel or other magnetically responsive material the detectors may detect its position at any time by variations in magnetic flux. If the float is nonmagnetic, it may be detected by reflected pulse signals of ultra high frequency, or by capacitance measurements, as will be obvious to those skilled in the art.

The signals received in the detectors 83 or 84, or both, may of course be amplified or used to control energizing circuits (not shown) by means of which various controls may be operated automatically. Thus, catalyst or other solids feed rates, temperatures, valves controlling the feed of liquids or gasiform fluids involved in the process, etc., may be automatically controlled so as to keep the bed level and/or other operating variables within desired limits. The details of the detector circuits and the controls form no part of the present invention.

Figures 6, 7:
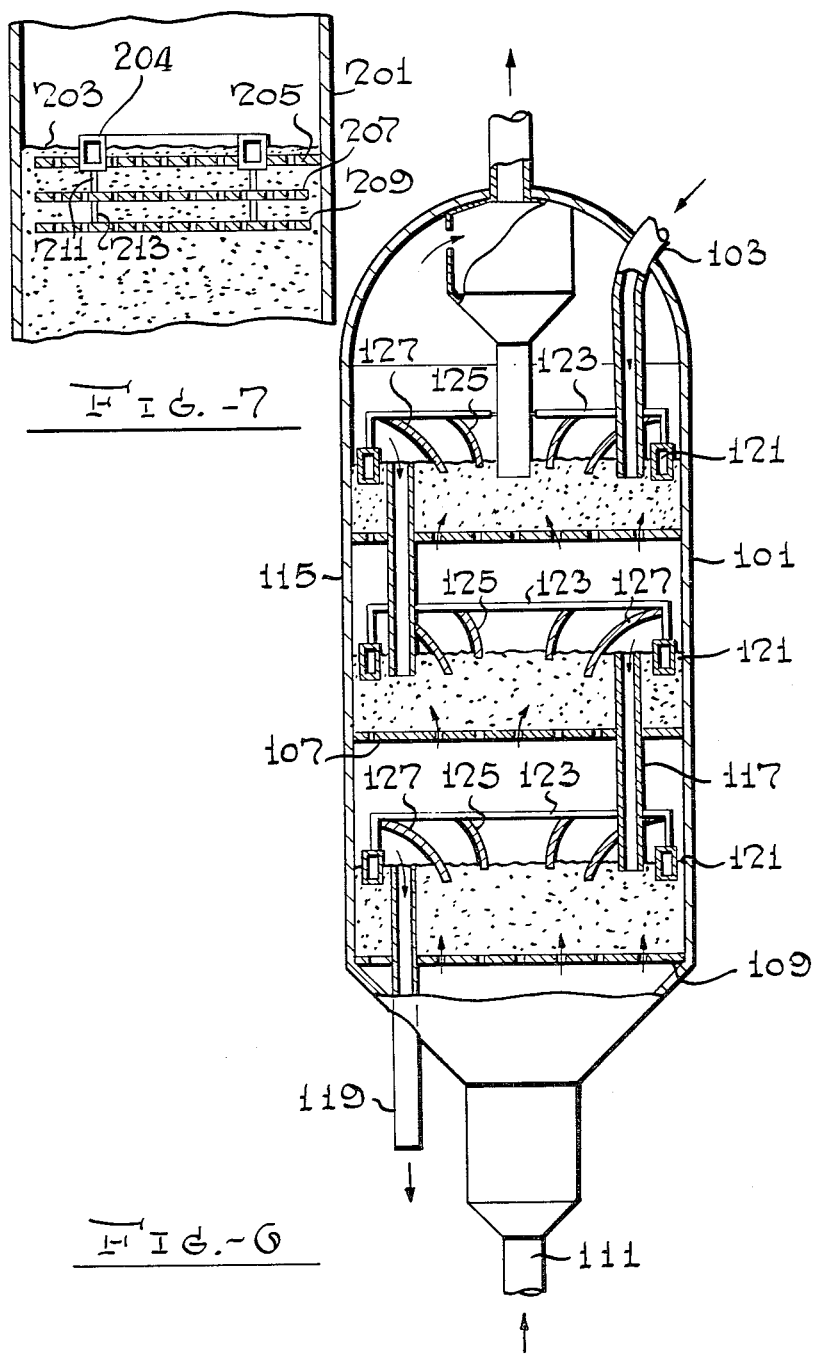
Figure 6 shows still another modification, using a plurality of floats for a multiple phase system.
Figure 7 shows an embodiment wherein baffle structure is supported by a floating structure within a dense phase of a fluidized solids system.

In Fig. 6 there is shown another modification where floating structure of the general type described above may be utilized in a multiple phase system. It is sometimes desirable to operate in multiple phases, as disclosed, for example, in the patent to Hemminger, No. 2,444,990. Also, in certain types of operation, it may be desirable to establish and maintain a certain temperature gradient or sequence for optimum production. For example, in catalytic reforming operations on hydrocarbon vapors, it is sometimes desirable to contact the vapors successively with hotter and hotter catalyst. In some cases, as where endothermic reactions are involved, this may be accomplished by introducing hot catalyst at the top of a cascade or other multiple phase reactor, introducing the relatively cool feed at the bottom so that the ascending vapors contact the various catalyst beds at progressively increasing temperatures. Such operations are sometimes desirable in fluid solids catalytic hydroforming of naphthas and other petroleum fractions.

By use of one or more floating units, which may carry baffles, suppressors for wave motion at the dense phase interface, and other analogous equipment, useful controls over such processes may be attained.

Thus, in Fig. 6 there is shown a reactor vessel 101 into which catalyst or other finely divided solid material may be introduced as through inlet 103. The solids are preferably fluidized by an upflow stream or streams of gases or vapors. Perforate partitions or grids 105, 107, 109 may be provided for supporting the respective beds or reaction phases.

Gasiform fluid is introduced at or near the bottom of the reactor, as through inlet 111, to pass upwardly through the several grids or partitions 105, 107, 109.

As will be obvious, the solids in the upper phase or bed are fluidized and overflow into the downflow tube 115 to the next phase. Here they are again fluidized and overflow to the next phase through downflow tube 117. This operation may be repeated for as many phases as are desired. From the last phase, the solids overflow to an exit tube, standpipe or the like 119 from which they may be withdrawn, recirculated, regenerated, or otherwise disposed of.

The same sort of turbulence, channeling, entrainment, etc., occurs in multiple phase operations as in single phase, though entrainment may not be objectionable outside of the last phase. Floating means are provided in a plurality of phases, and may be provided in all if desired. In Fig. 6 there are shown three phases with floating devices in each. Since the three floating devices are essentially similar, and all are generally like those of Fig. 2, a very brief description will suffice.

Floats 121, which may be rings or a plurality of separate float elements in each phase, support a superstructure 123 of appropriate light construction. This superstructure, in turn, supports functional equipment of the desired type. As shown in Fig. 6 this equipment is a baffle or suppressor construction embodying a plurality of baffle elements 125, 127 which preferably dip at least a short distance into the dense phase which supports the floating elements.

In some cases it may be desirable to interconnect two or more of the floating baffle units which may readily be done by connecting bars, links, etc. passing through one or more of the grids or partitions 105, 107 and/or 109. In this manner, an interdependent control over a plurality of phases may be maintained to suppress excessive ebullition, to maintain uniform bed density and/or depth, or to effect other controls. Such connecting means are not shown but could readily be provided by those skilled in the art, as will be obvious.

It will, of course, be understood that it is not necessary to use floats in all phases and in some cases only one or two will be employed. It may be desirable, for instance, to use a baffle only in the top phase. The use of floating suppressors may have advantage in reducing overall apparatus size by suppressing excessive turbulence and the invention contemplates the use of various combinations of similar or dissimilar units in the respective phases. The use of remote or indirect control, as in the apparatus of Fig. 5, also is contemplated.

It will be understood that any of the above embodiments of the invention may be applied to regenerator units as well as reactor units, e. g. to unit 14, Fig. 1, as well as or in addition to unit 10. It will also be understood that although the above description refers, in certain instances, to the use of finely divided catalysts, it is equally applicable to solids of all types which are fluidized for chemical treatment, for heat transfer, or for other analogous operations where contact of finely divided or granular solids with fluids, especially gases or vapors, is involved. Various other modifications will occur to those skilled in the art and it is intended to cover all such as properly come within the scope of the following claims, as limited by the prior art.

In Fig. 7 there is shown a different form of the invention where a float supports a baffle structure within the dense phase rather than above it. In this embodiment, a reactor, regenerator, or the like 201 contains a mass of fluidized solids of any suitable type. The dense phase of the fluidized mass has an upper level or interface 203. On this mass a float 204 of appropriate structure, like any of those previously described, is supported by buoyancy. In turn this float supports one or more baffle or suppressor plates or grids within the dense phase. The upper one of these grids or plates indicated at 205, may lie in a plane which intersects the float structure 204 where it is desired to have a grid or baffle near the interface. Such a grid, having openings for example which occupy of the order of one-third to two-thirds of its area, may be useful to suppress violent irregularities in ebullition in the bed.

As shown, two additional grids 207 and 209 are also supported beneath the float 204 by suitable connections 211, 213.

It will be understood that one or more of the plates or grids 205, 207 and/or 209 may be omitted, that additional grids may be provided if needed, or that a float supporting a combination of one or more baffles in the dispersed phase and one or more grids or plates in the dense phase may be used if desired.

In the claim, it will be understood that the expression "relatively constant elevation" with respect to the interface allows for variations in density which might vary the elevation of the float itself with respect to the interface.

What is claimed is:

An apparatus of the character described including, in combination, a vessel adapted to contain dense fluidized solids, means for passing a gasiform fluid upwardly through said vessel to maintain finely divided solids as a dense fluidized phase superimposed by a disperse phase with an interface of variable elevation between said phases, a gasiform fluid outlet tube leading from the top of said vessel, said outlet tube extending down into said vessel and being provided with a longitudinal spline, a buoyant float adapted to be supported by said dense fluidized solids, a cyclone separator provided with a keyed opening in its top for receiving said splined outlet tube, said cyclone separator being supported by said float and being adapted for vertical sliding movement on said splined outlet tube, and means for securing said cyclone separator to said float so that said cyclone separator is maintained at a relatively constant elevation with respect to the upper surface of said dense phase of fluidized solids.

References Cited in the file of this patent

UNITED STATES PATENTS

| | | |
|---|---|---|
| 1,616,547 | Pontoppidan | Feb. 8, 1927 |
| 2,366,372 | Voorhees | Jan. 2, 1945 |
| 2,444,990 | Hemminger | July 13, 1948 |
| 2,455,561 | Creelman | Dec. 7, 1948 |
| 2,456,233 | Wolf | Dec. 14, 1948 |
| 2,687,343 | Crask et al. | Aug. 24, 1954 |

FOREIGN PATENTS

| | | |
|---|---|---|
| 10,992 | Great Britain | 1905 |